(12) United States Patent
Oget

(10) Patent No.: US 7,380,723 B1
(45) Date of Patent: Jun. 3, 2008

(54) MONITORING OBJECT MOVEMENT

(75) Inventor: Guillaume Oget, Santa Clara, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 268 days.

(21) Appl. No.: 11/264,200

(22) Filed: Nov. 1, 2005

(51) Int. Cl.
*G06K 7/10* (2006.01)
(52) U.S. Cl. ............ 235/462.46; 235/384; 235/472.02; 235/491; 235/385; 340/572.1; 700/213; 700/214; 700/215
(58) Field of Classification Search ........... 235/462.46, 235/384; 340/572.1; 700/213–215
See application file for complete search history.

(56) References Cited

U.S. PATENT DOCUMENTS 5,227,803 A * 7/1993 O'Connor et al. .......... 342/442

FOREIGN PATENT DOCUMENTS

JP        08285623 A  * 11/1996

* cited by examiner

*Primary Examiner*—Michael G. Lee
*Assistant Examiner*—Kristy A. Haupt

(57) ABSTRACT

An object identifier for an object is read in a first reading area and a second reading area. A time the object entered the first reading area and a time the object exited the first reading area is determined. Also, a time the object entered the second reading area and a time the object exited the second reading area is determined. A direction of movement of the object is determined based on at least some of the determined times.

29 Claims, 8 Drawing Sheets

MONITORING OBJECT MOVEMENT

BACKGROUND

Products sold to customers are often sent through a series of intermediate points between the original source, such as a manufacturer, and the customers, who may buy the products from a retailer. Products may include food items, pharmaceutical drugs or other products, including products of manufacture. These products may be sold to a customer through a grocery store, a pharmacy, a department store or other type of retailer.

Products may be stored in the supply chain to the customer at any number of different points. Some of the products may need to be stored in specific warehouses depending on the type of product. If many products are shipped together, it may become difficult to determine if the correct products and the correct number of products have been provided to the correct entities in the supply chain. For example, it may be important for providers and/or receivers of milk to know whether a certain amount of milk has been delivered to a specific milk warehouse.

This product shipment information may be provided manually by the deliverer or receiver by writing or entering the information into some type of data entry device. However, the manual entry of information is prone to error that can be costly. For example, a data entry error may result in a shipment of perishable goods being sent to a wrong location, and the entire shipment may go bad.

The product shipment information may also be obtained by scanning products with a bar code scanner. For example, a bar code scanner is used to scan products loaded into a truck on a pallet. This type of system may minimize data enrty errors, but many times pallets are loaded and unloaded on the truck to make room for other shipments being loaded on the truck. Sometimes pallets unintentionally get left behind, and the bar code scanner system typically is unable to determine whether all the shipments that are supposed to be on the truck are on the truck.

SUMMARY

An object identifier for an object is read in a first reading area and a second reading area. A time the object entered the first reading area and a time the object exited the first reading area is determined. Also, a time the object entered the second reading area and a time the object exited the second reading area is determined. A direction of movement of the object is determined based on at least some of the determined times.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A system of monitoring movement of objects is described. One or more object identifiers may be placed on each object. As used in this specification, the term object may refer to any type of package or physical item capable of having some type of identifier affixed to it. Readers configured to read the object identifiers may define reading areas. A comparison of readings of a particular object in two or more of the reading areas may be used to determine a direction of movement of the particular object.

Figure 1:
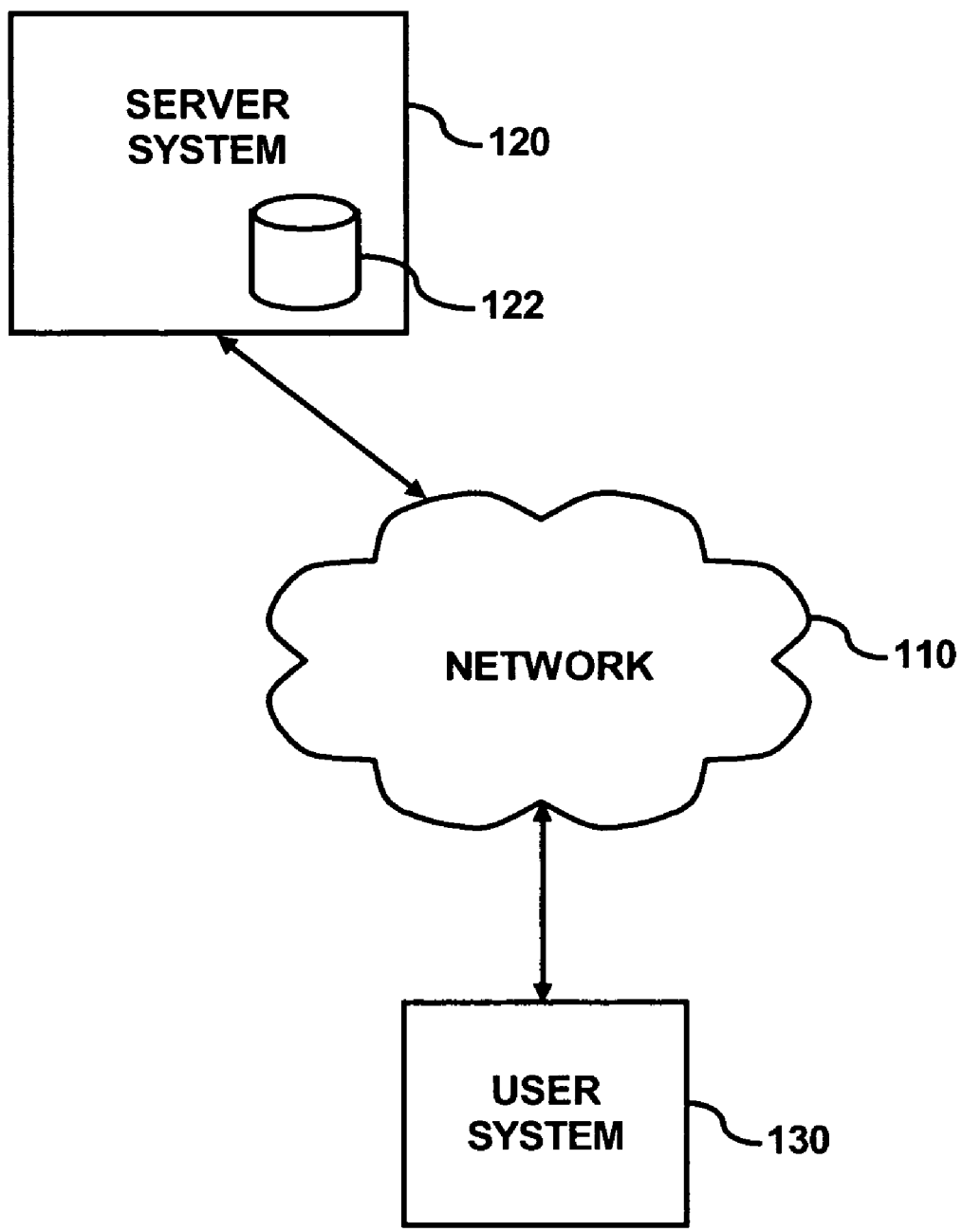
FIG. 1 illustrates an example of an authentication system.

FIG. 1 illustrates a simplified example of a system 100 through which an object may be monitored. The system 100 may include a network 110, a server system 120 and a user system 130. The server system 120 and the user system 130 may include any type of computer system, such as the computer system described with reference to FIG. 7. The server system 120 may include a network interface including software and/or hardware, and serving software (not shown) for communicating with other systems connected to the server system 120 through the network 110. The server system 120 may also include a database 122 storing object information with which the server system 120 may monitor objects. The object information may include object identifiers and times at which the object identifiers have been read by object identifier readers. The network 110 may include any type of network, including a LAN, a WAN, the Internet, etc.

In the system 100, a user system 130 may send object information such as times at which the object identifier of an object being monitored was read to a server system 120 via the network 110. In some embodiments, the times at which the object identifier was read may not be sent to the server system 120, and instead, be processed in the user system 130 only.

The object identifier may be read into the user system 120 by using some type of a reader or any other known procedure for automatically inputting data into a computer system. A reader may include any type of a reader for reading information, including any type of scanner (such as a bar code scanner), a radio frequency identification ("RFID") tag reader, etc.

In one example, the user system 130 submits the object identifier and times the object identifier was read to the sever system 120 through a website administered by the server system 120. The user system 130 submitting the object identifier 130 may be a user system associated with a first entity that is to receive the object or another user system associated with a second entity that requests information regarding whether the object was received by the first entity. Examples of the entities are described with respect to the supply chain shown in FIG. 2.

The server system 120 may process the received object identifier to determine in which direction the object(s) being monitored moved at a certain point in the supply cain. The point in the supply chain may include an entity of the supply chain or a delivery apparatus of the supply chain, such as a truck or other delivery vehicle. Information regarding the movement of the object(s) may be stored in a database 122. The server system 120 may transmit movement information to the user system 130 that submitted the object identification information or to another user system 130 requesting the movement information for the object(s).

Figure 2:
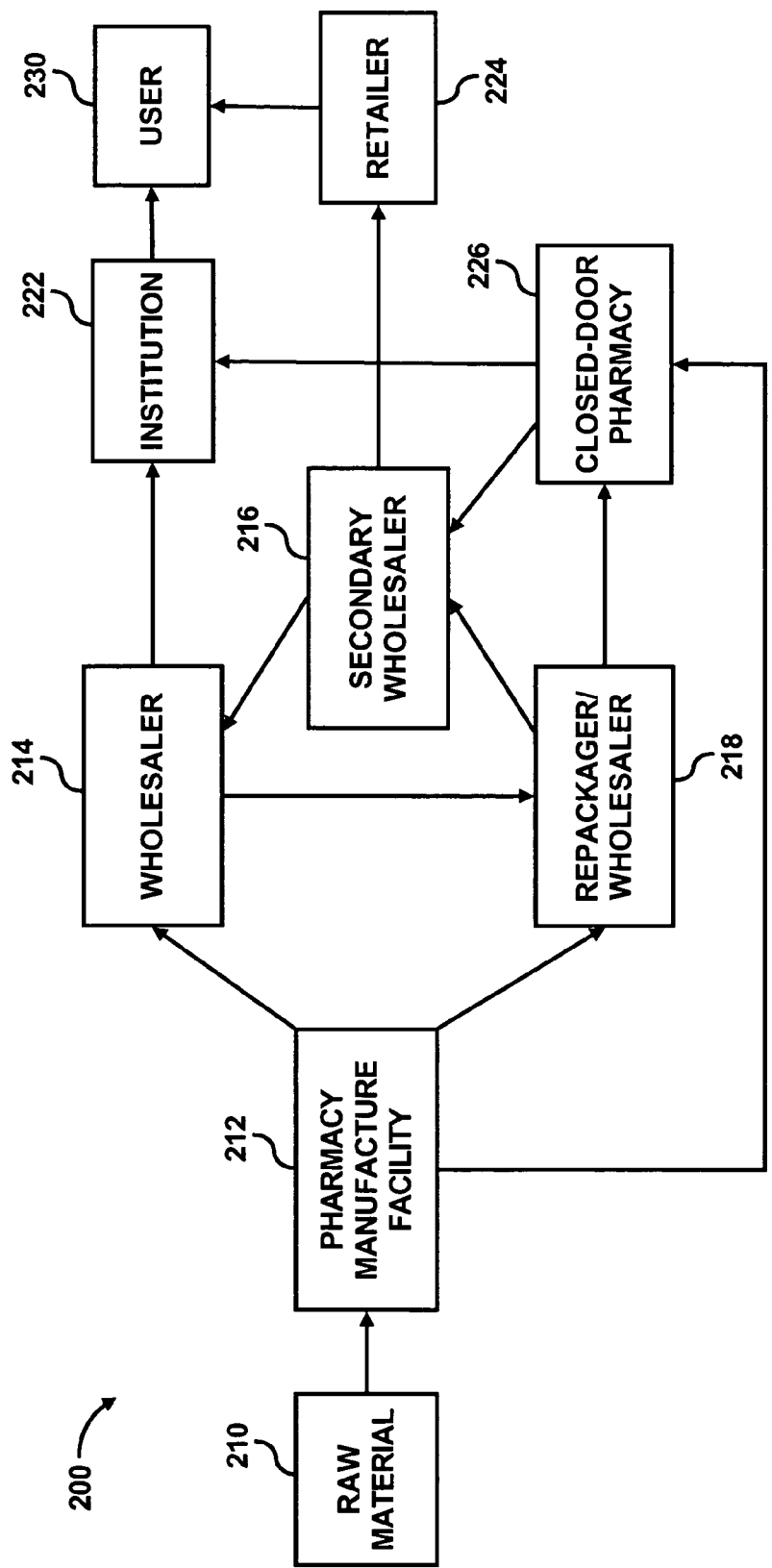
FIG. 2 illustrates an example of a supply chain in which an object monitoring system may be used.

The system 100 may be used to monitor any tope of product at any point of a supply chain, from the manufacturer to the customer. As an example, FIG. 2 illustrates a pharmaceutical supply chain and use of the monitoring system in FIG. 1 in the pharmaceutical supply chain. It will be apparent that the monitoring system can be used in supply chains for many product types. The monitoring system may also be used outside of the supply chain space as well, such as for asset tracking or people tracking, and for any purpose including security monitoring, asset management systems, etc.

FIG. 2 illustrates a simplified example of a supply chain 200 for the sale of pharmaceutical ("pharma") products. Although a pharma products supply chain is shown, the embodiments herein may be used with any type of supply chain. As shown in FIGS. 2, raw materials 210 are received by a pharma manufacturing facility ("PMF") 212. The PMF 212 sends the manufactured pharma products to a wholesaler 214 or a repackager/wholesaler 218. The wholesaler 214 may sell the pharma products to institutions 222, such as hospitals, nursing homes or hospices, or retailers 224, which sell the pharma products to individual users 230. The wholesaler 214 may also send some of its received pharma products to the repackager/wholesaler 218.

The repackager/wholesaler 218 may sell the pharma products to closed-door pharmacies 226. The close door pharmacies 226 sell the pharma products to institutions 222, such as hospitals, nursing homes or hospices. The PMF 212 may also directly provide pharma products to the closed-door pharmacies 226.

Due to the number of entities handling the pharma products as they progress through the supply chain, pharmacies 224 and institutions 222 may not be able to keep track of which pharma products have actually been delivered to which entity. For example, secondary wholesalers 216 may receive an indication from a deliverer that it has received a certain quantity of products, which the secondary wholesalers 217 may sell to retailers 224 or wholesalers 214. However, some of these products may either not have been unloaded into the secondary wholesaler's 217 storage facility or may have been reloaded onto the truck that delivered them. The secondary wholesale 217 or other entities in the supply chain or outside of the supply chain may use the monitoring system 100 described herein to determine whether the products have actually entered its storage facility and/or if the products remain in the storage facility.

Also, the monitoring system 100 in FIG. 1 may be used in the supply chain 200 to monitor pharma products produced by the PMF 212. The server system 120 used to monitor the pharma products may be administered by the PMF 212 or administered by an agent of the PMF 212 or any other entity. The user system 130 may be located at any of the locations in the supply chain 200, including the PMF 212, the institution 222, the pharmacies 224, closed-door pharmacies 226, the wholesaler(s) 214, repackager/wholesaler(s) 218, secondary wholesaler(s) 216, or individual user 230. Also, the user system 130 may be located at any point outside of the supply chain where monitoring of the pharma products is desired.

The embodiments described herein are not limited for use in a pharmaceutical supply chain, and may be used for authenticating any device or time that may store or otherwise include a package identifier.

For instance, a retailer in a grocery supply chain may need to know if it has received a certain amount of milk in a refrigerated warehouse. The retailer may use the monitoring system 100 to determine whether the milk has actually entered and/or remains in the refrigerated warehouse. The retailer may use this information to determine whether redelivery or additional deliveries of milk are needed to due to milk not being unloaded from the delivery apparatus or being reloaded onto the delivery apparatus.

Figure 3A:
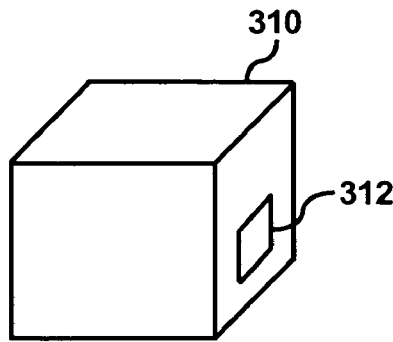
FIG. 3A illustrates an example of a package including a unique identifier for monitoring.

FIG. 3A illustrates an example of an object 310 including a unique identifier for monitoring. The object 310 may include any type of package or time. The object 310, in the example of a pharma product, may include a container, a carton or a pallet, where a carton includes 20-30 containers and a pallet includes about 500 or more cartons. A container may include a box or a bottle or any other type of receptacle or container for goods. A container could be made of one or a combination of materials (such as plastic, metal, cardboard).

The object 310 may include an object identifier 312. The object identifier 312 may be affixed using any method of affixing. The term "affixed" to the object, as used in this applications, may refer to anything that is integral to the object in some way. For example, the object identifier 312 may be printed on or embedded within the object. The object identifier 312 may also be permanently or semi-permanently attached to the object during manufacture or shortly thereafter using adhesive or mechanical methods.

The object identifier 312 may be affixed using a printing process. Also, the object identifier 312 may be embodied in a label, a bar code, a RFID tag or an embedded microprocessor, an electric substrate or some other type of electronic active device with memory capabilities used to store the object identifier 312 until it is further accessed for monitoring at some other point of the supply chain. The embodied object identifier is affixed to the object 310. For example, the object 310 may include an RFID tag or embedded microprocessor, an electronic substrate or a type of electronic active device or a unique identifier affixed to the object 310 in some way. The RFID tag may include one or more types of object identifiers 312 for the object 310, such as a serial number.

The RFID tag uses radio frequency technology to transmit information stored in the RFID tag. For example, the RFID tag may include an integrated circuit and an antenna. The RFID tag preferably includes a passive RFID tag (not using an internal power source such as a battery). However, an active RFID tag (using an internal power source, such as battery) may be used. A RFID reader may read the RFID tag. The RFID reader may generate a magnetic field for interrogating the tag using an antenna, which may include an inductive element. The magnetic field induces an energizing signal for powering a passive RFID tag via the antenna. When powered, the RFID tag generates a signal that may include the object identifier associated with the object 310. The signal is modulated using a known modulation scheme and transmitted to the RFID reader.

The RFID tag may be rad or written to from distances of up to 20 feet, and is not required to be in the line of sight of the RFID reader to be read. The RFID tag may be affixed onto the object 310 prior to, during, or after a process of printing information on the material used to from the object 310 or on material affixed to the object 310, such as a label. It will be apparent to one of ordinary skill in the art, that instead of a RFID tag, any known technique may be used for storing the object identifier on the object 310, such a bar code, other types of printed mediums, tag other than radio frequency, and any storage medium that may be affixed to or may be included in the object 310.

Figure 3B:
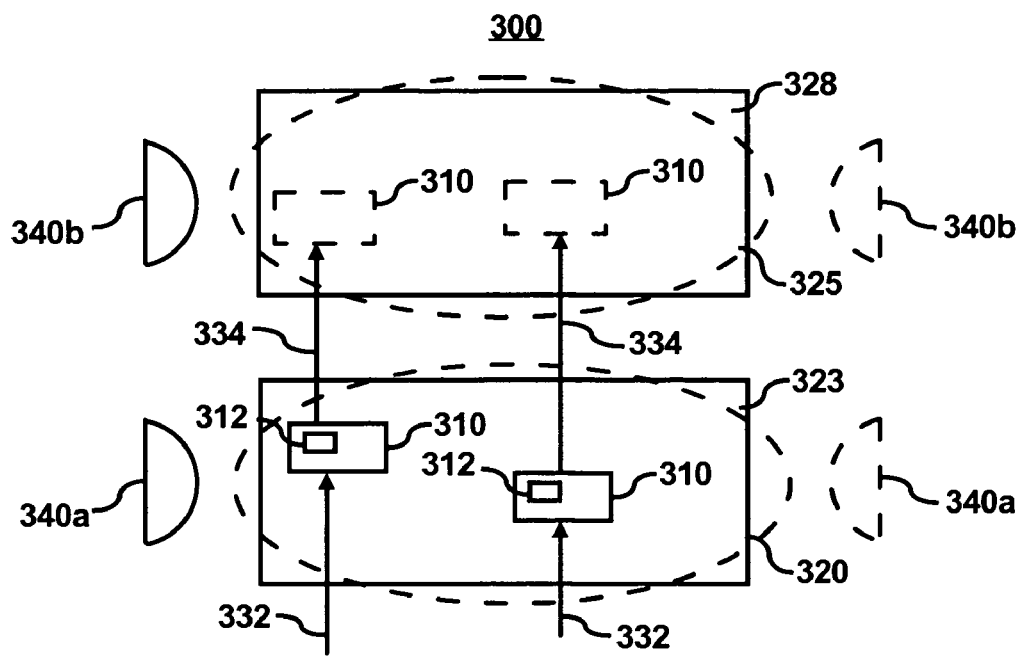
FIGS. 3B and 3C illustrate examples of configurations for monitoring objects.
Figure 3C:
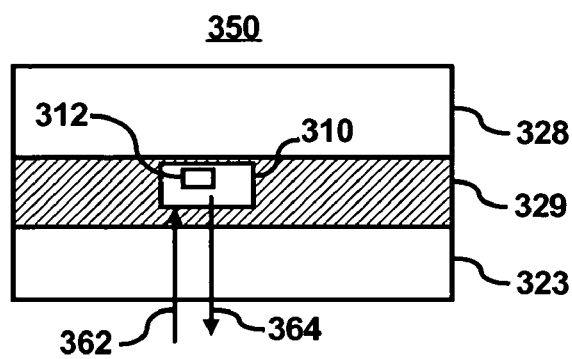

FIGS. 3B and 3C illustrate examples of configurations for monitoring objects. FIG. 3B illustrates a configuration 300 for identification reading areas 323 and 328. The reading areas 323 and 328 may include a first reading area 323 and a second reading area 328. The reading areas 323 and 328 may be formed using the readers 340. The readers 340, for example, are RFID readers and the object identifiers are provided in RFID tags. Other types of readers may be used and the object identifiers may be affixed to objects using means other than RFID tags. The readers 340 may provide a list of object identifiers that are in its corresponding reading area 323 and 328 as well as a read count. The read count may include the number to times the reader 340 was able to read those object identifiers per unit of time (e.g., number of readings per second). The server system 120 receiving the read count information from the readers 340 may add a timestamp to the read count information prior to storage. The analysis module 420 may determine the time when identifiers enter the reading area by considering a non-null read count preceded by a null read count or a no entry on the database 122 for each identifier. Similarly, the module 420 may determine, for example, when an identifier leaves a reading area by considering a non-null read count for the identifier followed by either a null read count or no information about the identifier.

The read count information may be used to identify (1) an object identifier, such as the object identifier 312, or a set of object identifiers coming into the reading area 323 and 328 and (2) an object identifier 312 or set of object identifiers 312 leaving the reading area 323 and 328.

In some embodiments, more than one reader may be used to form the reading area 323 and 328. For example, as shown in FIG. 3B, readers 340a and 340b may be placed on either side of a desired reading area 323 and 328. One or more first readers 340a may be used to form the first reading area 323 and one or more second readers 340b may be used to form the second reading area 328. In some embodiments, the first readers 340a and the second readers 340b are the same type of readers.

Although the reading areas 323 and 328 are shown as rectangles for simplicity of illustration, the reading areas may be of other shapes. For example, each reading area may be an oval shape such as the reading areas 320 and 325 shown in dashed lines to illustrate an example of how an actual reading area may look. The type of reader may determine the actual range and shape of the reading areas 323 and 328. For example, if the readers 340a and 340b include an antenna, the range and shape of the reading areas 323 and 328 may depend on whether the antenna is circularly polarized or if the antenna is linearly polarized. In addition, the way in which object identifiers are stored may affect range. For example, if the object identifiers are stored in RFID tags, tag orientation may affect the range.

In the configuration shown in FIG. 3B, the reading areas 323 and 328 are separated from each other. The object 310 is shown moving through the reading areas 323 and 328. A first arrow 332 shows the object 310 moving into the first reading area 323. A second arrow 334 shows the object 310 moving into the second reading area 328. Although two objects 310 are shown, any number of objects 310 may move through the reading areas 323 and 328. For example, as few as one object 310 may move through one or more of the reading areas 323 and 328. The time at which the object identifier 312 is read by each reader 340a and 340b is recorded to provide the following information:

$T_{1i}$: Time at which the object enters the first reading area 323 (or the time at which the reader(s) 340a corresponding to the first reading area 323 first records the object identifier 312 associated with the object 310). This time, $T_{1i}$, may also be considered as the time the object identifier 312 is first observed by the first reader(s) 340a in the first reading area 323.

$T_{1o}$: Time at which the object leaves the first reading area 323 (or the time at which the readers(s) 340a corresponding to the first reading are 323 last records the object identifier 312 associated with the object 310). This time, $T_{1o}$, may also be considered as the time the object identifier 312 is last observed by the first reader(s) 340a in the first reading area 323.

$T_{2i}$: Time at which the object enters the second reading area 328 (or the time at which the readers(s) 340b corresponding to the second reading area 328 first records the object identifier 312 associated with the object 310). This time, $T_{2i}$, may also be considered as the time the object identifier 312 is first observed by the second reader(s) 340b in the second reading area 328.

$T_{2o}$: Time at which the object leaves the second reading area 328 (or the time at which the reader(s) 340b corresponding to the second reading area 328 last records the object identifier 312 associated with the object 310). This time, $T_{1i}$, may also be considered as the time the object identifier 312 is last observed by the second reader(s) 340b in the second reading area 328.

For simplicity of illustration, it is assumed that the object 310 is moving along a straight line (in other words, not changing directions). If $T_{2i} > T_{1i}$, then this indicates that the object 310 is moving from the first reading area 323 to the second reading area 328. If $T_{2o} > T_{1o}$, then this also indicates that the object is moving from the first reading area 323 to the second reading area 328. This movement is shown in FIG. 3B. The assumptions of determining whether the object 310 is moving from the first reading area 323 to the second reading area 328 or vice versa may be based on the last observed time. For example, if $T_{2o} > T_{1o}$, it is assumed the object 310 is moving from the first reading area 323 to the second reading area 328 because the last observed time is $T_{2o}$. The object 310 may then return back to the first reading area 323 and then $T_{1i} > T_{2i}$.

If $T_{1i} > T_{2i}$, then this indicates that the object 310 is moving from the second reading area 328 to the first reading area 323. If $T_{1o} > T_{2o}$, then this also indicates that the object is moving from the second reading area 328 to the first reading area 323.

FIG. 3C illustrates a configuration 350 where the first reading area 323 and the second reading area 328 are overlapping to form an overlapped section 329 of the two reading areas. In this configuration, it may be deduced whether the object, such as the object 310 shown in FIG. 3B, made a U-turn in the overlapped section 329. For example, if $T_{1i} < T_{2i}$ and $T_{1o} > T_{2o}$, then this indicates that the object made a U-turn in the overlapped section 329. This is determined by observing that the object 310 entered the first reading area 323 before entering the second reading area 328 ($T_{1i} < T_{2i}$), and the object 310 exited the second reading area 328 before exiting the first reading area 323 ($T_{1o} > T_{2o}$).

By analyzing timing and exiting for reading areas 323 and 328 that are near each other, as shown in FIG. 3B, or overlapping, as shown in FIG. 3C, the movement of objects 310 may be determined.

Figure 4:
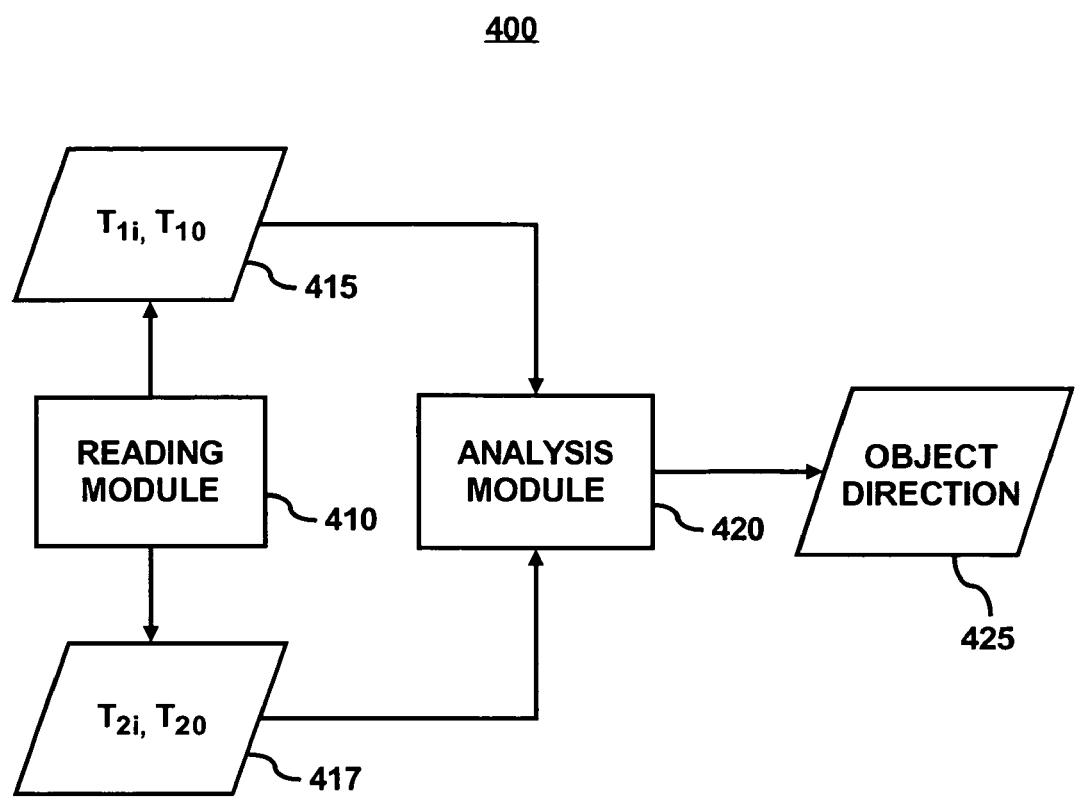
FIG. 4 is a data flow diagram illustrating a method for monitoring an object.

FIG. 4 is a data flow diagram illustrating a method for monitoring an object. An object identifier may be read by a reading module 410 at various times in two or more reading areas, such as the reading areas 323 and 328 shown in FIGS. 3B and 3C. The output of the reading module may include first reading area readings 415, including at least the time the object entered the first reading area, $T_{1i}$, the time the object exited the first reading area, $T_{1o}$, and second reading area readings 417, including at least the time the object entered the second reading area, $T_{2i}$, and the time the object exited the second reading area, $T_{2o}$. The reading module 410 may be further configured to read a plurality of object identifiers where at least two of the object identifiers are associated with different objects. In some embodiments, the reading module 410 may be configured to read a plurality of object identifiers where each of the object identifiers is associated with a different object.

The first reading area readings 415 and the second reading area readings 417 may be provided to an analysis module 420. The reading module 410 may be part of a user system, such as the user system 130 shown in FIG. 1. The analysis module 420 may be part of the user system 130 and/or part of the server system 120.

The analysis module 420 may perform analysis on the readings 415 and 417 to determine in which direction the object associated with the object identifier read by the reading module is moving. The analysis module 420 may output the object direction 425 to either the user system 130 that read the object identifier or another user system 130 that requests the object direction 425 of a particular object.

Figure 5A:
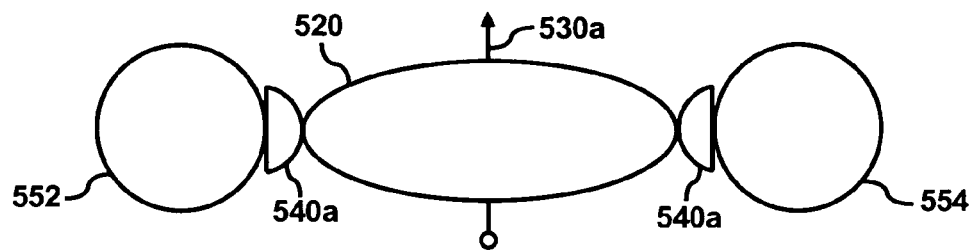
FIGS. 5A-5D illustrate examples of systems for monitoring objects through an opening.

FIGS. 5A-5D illustrate examples of assemblies for monitoring objects through an opening. FIG. 5A illustrates an arrangement of a first set of readers 540a at an opening of a structure, where directions of object movements are to be monitored through the opening. The opening is defined by a first side 552 and a second side 554. The opening may include a doorway or other opening in a building or the door of a truck or other delivery apparatus. The opening may also include a space defined by the sides 552 and 554. Each of the sides 552 and 554 of the opening may include a pillar, a wall or other structure that may be used to define the opening.

As shown in FIG. 5A, the first reading area 520 may be defined using at least one reader 540a. Two readers 540a may be used to improve read quality (in other words, reduce the number of missed unique identifier readings in the read area 520). A second reading area (not shown) may be placed at either near the beginning of the arrow 530a, showing the direction in which objects are to move, or near the end of the arrow 530a.

Figure 5B:
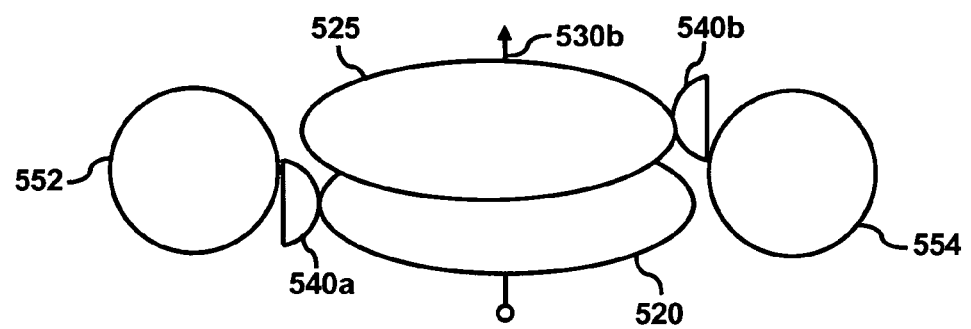

FIG. 5B illustrates a monitoring assembly in which two readers 540a and 540b are arranged to be unaligned. In other words, at least one horizontal axis of the first reading area 520 across an opening defined by the first side 552 and the second side 554 is displaced in relation to at least one horizontal axis of the second reading area 525 across the opening. The unaligned readers 540a and 540b form overlapping reading areas 520 and 525. The arrow 530b illustrates the direction in which objects are to move through the opening formed by the sides 552 and 554.

Figure 5C:
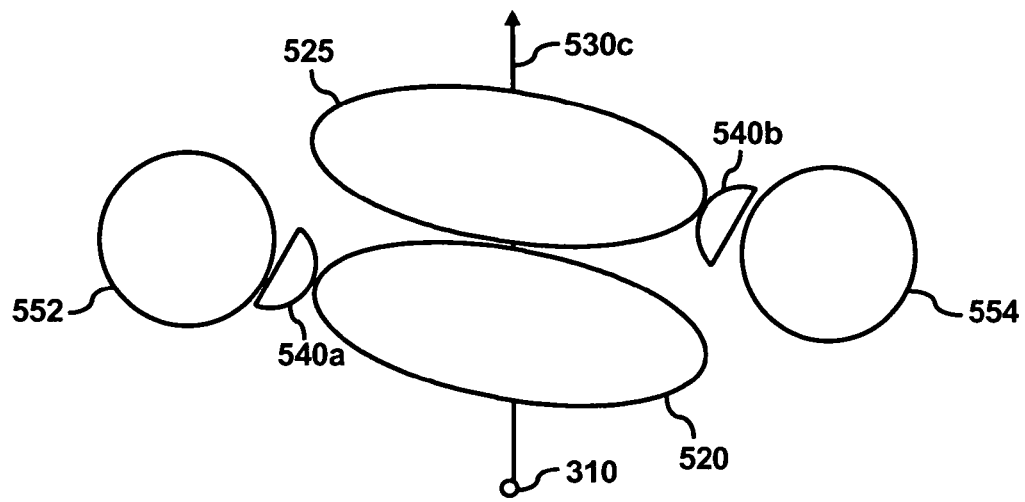

FIG. 5C illustrates a monitoring assembly in which the two readers 540a and 540b are slightly rotated, in relation to a horizontal axis across the opening, as well as unaligned. In this setup, the readers 540a and 540b do not form overlapping read areas. Rotated readers may accommodate a physical environment where the pillars have a small diameter compared to the antenna sizes. If the pillars have a small diameter in comparison to the antenna sizes, the two antennae would be positioned face to face. The rotated antenna arrangement allows a greater area to be covered than if the two antennae were face to face. An arrow 530c illustrates the direction in which objects are to move through the opening defined by the first side 552 and the second side 554.

Figure 5D:
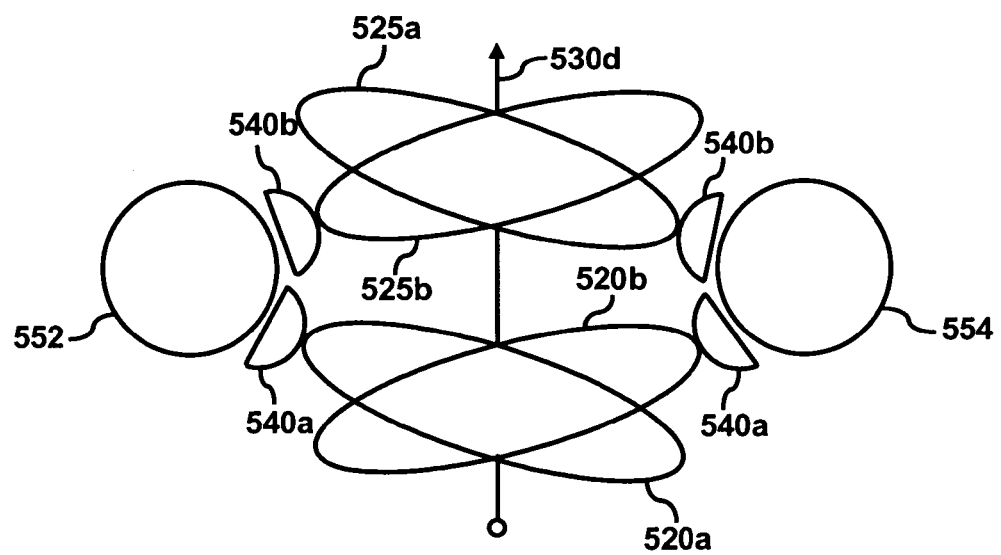

FIG. 5D illustrates a monitoring assembly in which a secondary reader 540a and 540b is provided for each corresponding reading area. However, in this arrangement, each of the secondary readers are rotated to mirror the primary reader 540a and 540b of each reading area. Thus, each of the reading areas includes two sub reading areas. Each of he sub-reading areas 520b and 525b provided by the secondary readers 540a and 540b crosses the each of the sub-reading areas 520a and 525a of the primary readers 540a and 540b to provide redundancy of reading through a central portion of each of the first and second reading areas. Thus, read quality is increased in the central portions of the first and second reading areas. An arrow 530d illustrates the direction in which objects are to move through the opening defined by the first side 552 and the second side 554. Time measurements that are performed in the arrangements shown in FIGS. 5A-5D and the system shown in FIGS. 5A-5D are similar to those of FIG. 4. Although direction of movement is shown by signal arrows in each of FIGS. 5A-5D, direction of movement of the object(s) 310 may occur in both directions.

Figure 6:
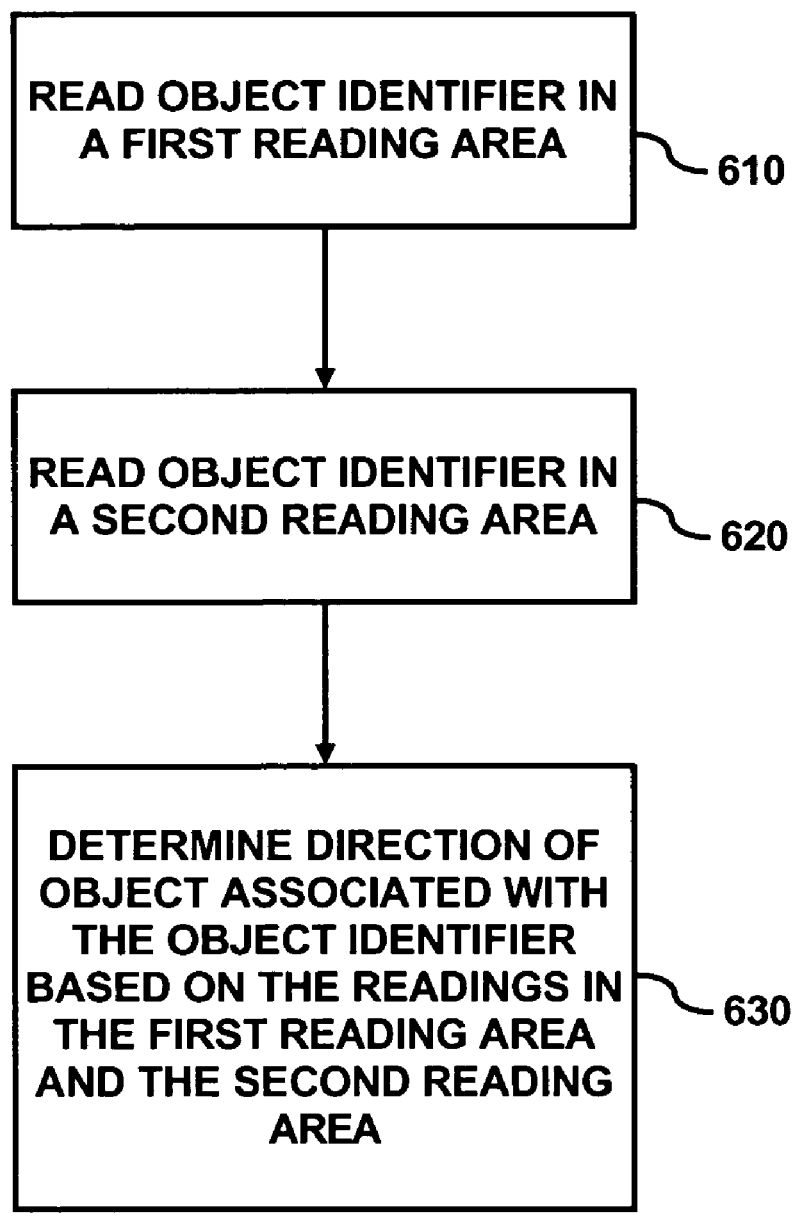
FIG. 6 is a flow diagram illustrating an embodiment of a method of monitoring object movement.

FIG. 6 is a flow diagram illustrating an embodiment of a method of monitoring object movement. In step 610, an object identifier is read in a first reading area. The object identifier may be read using a first reader, such as the reader 340 shown in FIGS. 3B, 3C and FIGS. 5A-D.

At step 620, the object identifier may be read in a second reading area. The object identifier may be read in the second reading area using a second reader.

At step 630, a direction of movement of an object associated with the object identifier may be determined based on the readings of the object identifier in the first reading area and the second reading area. Examples of the direction of movement include a direction from the first reading area to the second area or a direction from the second reading area to the first reading area. These directions may be assigned other directions, such as North, South, East, West, and the like, or may be assigned directions, such as entering the warehouse or exiting the warehouse.

Times, such as $T_{1i}$, $T_{1o}$, $T_{2i}$ and $T_{2o}$ described above with respect to FIG. 3B may be determined from the readings in the first and second reading areas. From at least some of these times, the direction of movement of the object may be determined. The direction of movement may be computed by comparing at least one of the times at which the object identifier was recorded in the first reading area and at least one of the times at which the object identifier was recorded in the second reading area, as described above with respect to FIG. 3B. The times at which the object identifier was read in the first reading area may be determined based on the number of times a reader in the first reading area was able to read the object identifier per unit of time. For example, the read count may include the number of times the reader was able to read those object identifiers per unit of time (e.g., number of readings per second). The times at which the object identifier was read in the second reading area may be determined based on how many times a reader in the second reading area was able to read the object identifier per unit of time.

Figure 7:
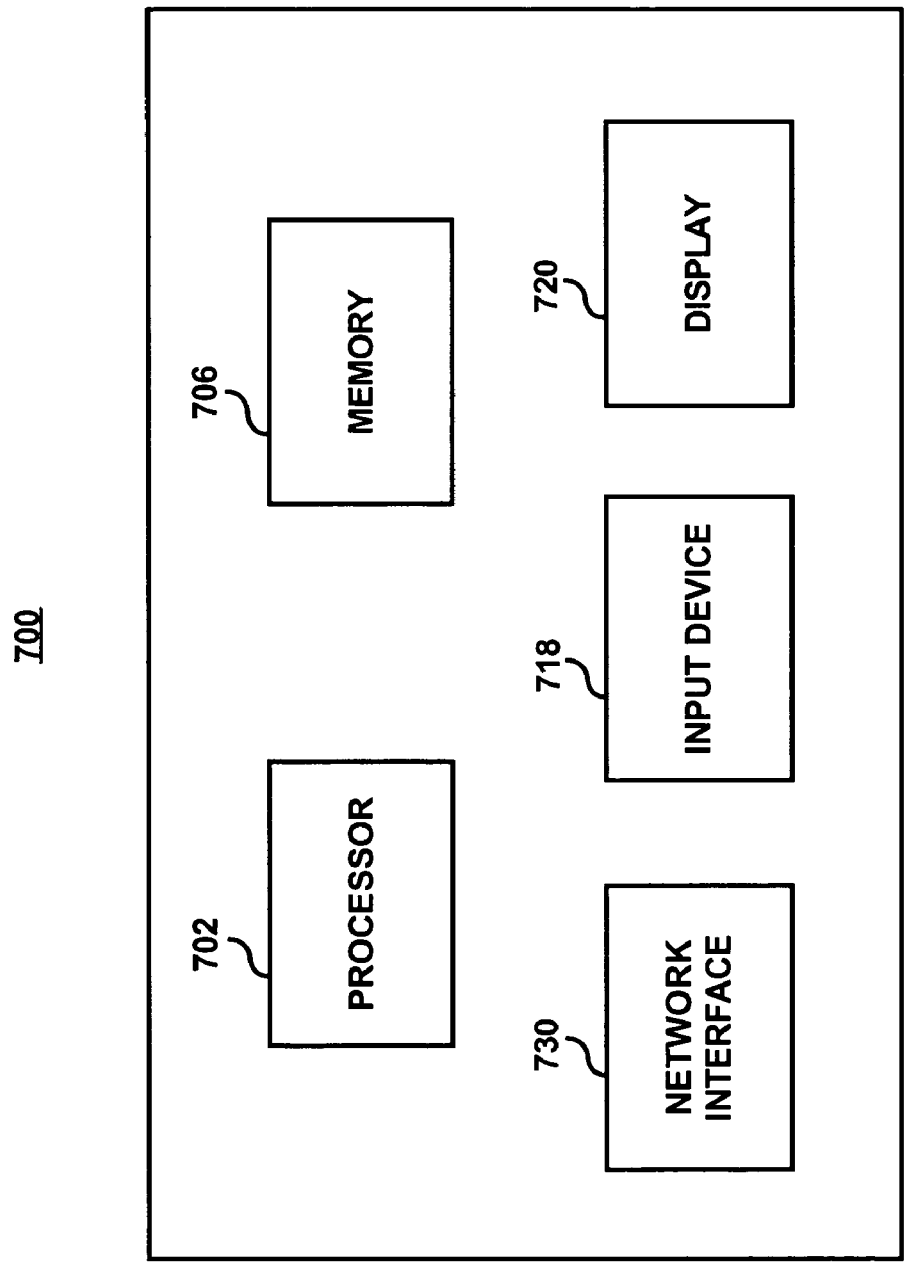
FIG. 7 is a block diagram illustrating a computer system operable to perform the method depicted in FIG. 6.

Referring to FIG. 7, and also with reference to FIG. 1, a schematic diagram of a computer system 700 is shown in accordance with an embodiment. The computer system 700 shown may be used as a server system or a user system in the system shown in FIG. 1. The computer system 700 may include one or more processors, such as processor 702, providing an execution platform for executing software. The computer system 700 also includes a memory 706, which may include Random Access Memory (RAM) where software is resident during runtime. Other types of memory such as ROM (read only memory), EPROM (erasable, programmable ROM), EEPROM (electrically erasable, programmable ROM) and data storage, such as hard disks, etc., may be used.

A user interfaces with the computer system 700 with one or more input devices 718, such as a keyboard, a mouse, a stylus, and the like and a display 720. A network interface 730 is provided for communicating with other computer systems. It will be apparent to one of ordinary skill in the art that FIG. 7 is meant to illustrate a generic computer system. Any type of computer system may be used. Furthermore, one or more components of the components of the computer system 700 are optional, such as the display and input devices, and other types of components may be used or substituted as is known in the art.

One or more of the steps of the operation 600, as shown in FIG. 6, may be implemented as software embedded on a computer readable medium, such as the memory 706, and executed by the processor 702. The steps may be embodied by a computer program, which may exist in a variety of forms both active and inactive. For example, there may exit as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims— and their equivalents—in which all terms are meant in their broadest reasonable sense unless otherwise indicated.

What is claimed is:

1. A method of monitoring object movement, the method comprising:
    attempting to read an object identifier of an object in a first reading area, resulting in a plurality of first null read counts for failing to read the object identifier of the object in the first reading area;
    reading the object identifier of the object at least one time in the first reading area;
    determining a time the object entered the first reading area using at least one first timestamp from the at least one time the object identifier was read in the first reading area, wherein the at least one first timestamp is immediately preceded by one of the plurality of first null read counts; and
    determining a time the object exited the first reading area using the at least one first timestamp from the at least one time the object identifier was read in the first reading area, wherein the at least one first timestamp is immediately followed by another of the plurality of first null read counts;
    attempting to read the object identifier of the object in a second reading area resulting in a plurality of second null read counts for failing to read the object identifier of the object in the second reading area;
    reading the object identifier at least one time in the second reading area;
    determining a time the object entered the second reading area using at least one second timestamp from the at least one time the object identifier was read in the second reading area, wherein the at least one second timestamp is immediately preceded by one of the plurality of second null read counts; and
    determining a time the object exited the second reading are using the at least one second timestamp from the at least one time the object identifier was read in the second reading area, wherein the at least one second timestamp is immediately followed by another of the plurality of second null read counts; and
    determining a direction of movement of the object based on at least some of the determined times the object entered or exited the first or second reading areas.

2. The method of claim 1, wherein reading the object identifier at least one time in a first reading area comprises reading a time at which the object identifier is first observed in the first reading area and a time at which the object identifier is last observed in the first reading area.

3. The method of claim 1, wherein reading the object identifier at least one time in a second reading area comprises reading a time at which the object identifier is first observed in the second reading area and a time at which the object identifier is last observed in the second reading area.

4. The method of claim 1, wherein determining the direction of movement of the object further comprises:
    determining the direction of movement of the object based on a comparison of at least one of the times at which the object identifier was read in the first reading area and at least one of the times the object identifier was read in the second reading area.

5. The method of claim 1, wherein reading the object identifier at least one time in the first reading area further comprises:
    reading a plurality of object identifiers in the first reading area.

6. The method of claim 1, wherein reading the object identifier at least one time in the second reading area further comprises:

reading a plurality of object identifiers in the second reading area.

7. The method of claim 1, wherein reading the object identifier at least one time in the first reading area comprises reading the object identifier using at least one first reader and reading the object identifier at least one time to the second reading area comprises reading the object identifier using at least one second reader.

8. The method of claim 7, wherein at least one of the first reader and the second reader comprises a RFID reader.

9. The method of claim 1, wherein determining the direction of movement of the object further comprises:
determining the direction of movement of the object based on a number of times a reader in the first reading area was able to read the object identifier per unit of time in the first reading area and a number of times a reader in the second reading area was able to read the object identifier per unit of time in the second reading area.

10. The method of claim 1, wherein reading the object identifier at least one time in the first reading area and reading the object identifier at least one time in the second reading area further comprises:
reading at least one of an object identifier affixed by a printing process, a label, a bar code, a RFID tag, an embedded microprocessor, an electronic substrate or some other type of electronic active device with memory capabilities.

11. The method of claim 1, wherein determining the direction of movement of the object further comprises:
determining if the object made a U-turn.

12. A system for monitoring direction of an object, the system including:
an analysis module configured to receive an object identifier associated with an object read at least one time from each of a first reading area and a second reading area and a plurality of first and second null read counts representing a failure to read the object identifier associated with the object in the first reading area and the second reading area, respectively,
wherein the analysis module is further configured to determine a time the object entered the first reading area and a time the object exited the first reading area using at least one first timestamp from the at least one time the object identifier was read in the first reading area, wherein the at least one first timestamp is immediately proceeded by one of the plurality of first null read counts and immediately followed by another of the plurality of first null read counts;
wherein the analysis module is further configured to determine a time the object entered the second reading area and a time the object exited the second reading area using at least one second timestamp from the at least one time the object identifier was read in the second reading area, wherein the at least one second timestamp is immediately preceded by one of the plurality of second null read counts and immediately followed by another of the plurality of second null read counts;
wherein the analysis module is further configured to determine a direction of movement of the object based on at least some of the determined times the object entered or exited the first or second reading areas.

13. The system of claim 12, further comprising:
at least a first reader; and
a second reader, wherein a reading area of the first reader defines the first reading area and a reading area of the second reader defines the second reading area.

14. The system of claim 13, wherein the first reader and the second reader are arranged to be unaligned.

15. The system of claim 14, wherein the first reader and the second reader are arranged so that the first reading area and the second reading area overlap.

16. The system of claim 14, wherein the first reader and the second reader are arranged so that the first reading area and the second reading area do not overlap.

17. The system of claim 13, wherein the first reader and the second reader are arranged to be slightly rotated in relation to a horizontal axis across an opening defined by a first side and a second side.

18. The system of claim 13, wherein the first reader comprises two readers, a primary first reader and a secondary first reader, wherein the secondary first reader is arranged opposite the primary first reader and rotated in mirror the primary first reader so that the first reading area includes two sub-first reading areas, and wherein the second area comprises two readers, a primary second reader and a secondary second reader, wherein the secondary second reader is arranged opposite the primary second reader and rotated in mirror the primary second reader so that the second reading area includes two sub-second reading areas.

19. The system of claim 12, further comprising:
a reading module configured to read the object identifier in the first reading area and the second reading area.

20. The system of claim 19, wherein the reading module is configured to read a plurality of object identifiers, wherein at least two of the object identifiers are associated with different objects.

21. The system of claim 19, wherein the reading module is configured to provide to the analysis module with a number of times a reader forming the first reading area was able to read the object identifier per unit of time in the first reading area and a number of times a reader forming the second reading area was able to read the object identifier per unit of time in the second reading area.

22. The system of claim 19, wherein the reading module is located at a user system.

23. The system of claim 19, wherein the reading module comprises at least one first reader forming the first reading area and at least one second reader forming the second reading area.

24. The system of claim 12, wherein the first reading area and the second reading area overlap.

25. The system of claim 12, wherein the first reading area and the second reading area are located near each other.

26. The system of claim 12, wherein the analysis module is located at a server system.

27. The system of claim 12, wherein the analysis module is located in a user system.

28. An apparatus for monitoring object movement, the apparatus comprising:
means for attempting to read an object identifier of an object in a first reading area resulting in a plurality of first and second null read counts for failing to read the object identifier of the object in the first reading area and the second reading area, respectively;
means for reading the object identifier for the object at least one time in the first reading area;
means for reading the object identifier for the object at least one time in a second reading area;

means for determining a time the object entered and a time the object exited the first reading area using at least one first timestamp from the at least one time the object identifier was read in the first reading area and for determining a time the object entered and a time the object exited the second reading area using at least one second timestamp from the at least one time the object identifier was read in the second reading area, wherein the at least one first timestamp is immediately preceded by one of the plurality of first null read counts and the at least one second timestamp is immediately preceded by one of the plurality of second null read counts and, wherein the at least one first timestamp is immediately followed by another of the plurality of first null read counts and the at least one second timestamp is immediately followed by another of the plurality of second null read counts, respectively; and means for determining a direction of movement of the object based on at least some of the determined times the object entered or exited the first or second reading areas.

29. A computer program product embodied on a computer-readable medium and comprising code that, when executed, causes a computer to perform the following:

receiving a plurality of first null read counts as a result of a failure to read an object identifier for an object in a first reading area;

receiving at least one reading of the object identifier for the object from the first reading area;

receiving a plurality of second null read counts as a result of a failure to read the object identifier for the object in a second reading area;

receiving at least one reading of the object identifier from the second reading area;

determining a time the object entered and a time the object exited the first reading area using at least one first timestamp from the at least one time the object identifier was read in the first reading area, wherein the at least one first timestamp is immediately preceded by one of the plurality of first null read counts and immediately followed by another of the plurality of first null read counts;

determining a time the object entered and a time the object exited the second reading area using at least one second timestamp from the at least one time the object identifier was read in the second reading area, wherein the second timestamp is immediately preceded by one of the plurality of second null read counts and immediately followed by another of the plurality of second null read counts; and determining a direction of movement of the object an object associated with the object identifier based on at least some of the determined times the object entered or exited the first or second reading areas.

* * * * *

UNITED STATES PATENT AND TRADEMARK OFFICE
CERTIFICATE OF CORRECTION

PATENT NO. : 7,380,723 B1
APPLICATION NO. : 11/264200
DATED : June 3, 2008
INVENTOR(S) : Guillaume Oget It is certified that error appears in the above-identified patent and that said Letters Patent is hereby corrected as shown below:

In column 1, line 34, delete "enrty" and insert -- entry --, therefor.

In column 2, line 18, after "system" delete "of" and insert -- for --, therefor.

In column 2, line 59, delete "sever" and insert -- server --, therefor.

In column 3, line 3, delete "cain." and insert -- chain. --, therefor.

In column 3, line 12, delete "tope" and insert -- type --, therefor.

In column 3, line 27, delete "FIGS. 2," and insert -- FIG. 2, --, therefor.

In column 3, line 53, delete "wholesale" and insert -- wholesaler --, therefor.

In column 4, line 6, delete "time" and insert -- item --, therefor.

In column 4, line 19, delete "time." and insert -- item. --, therefor.

In column 4, line 39, delete "electric" and insert -- electronic --, therefor.

In column 4, line 55, after "as" insert -- a --.

In column 4, line 65, delete "rad" and insert -- read --, therefor,

In column 5, line 2, delete "from" and insert -- form --, therefor.

In column 5, line 6, delete "a" and insert -- as --, therefor.

In column 5, line 22, delete "to" and insert -- of --, therefor.

In column 6, line 17, delete "are" and insert -- area --, therefor.

In column 8, line 17, delete "he" and insert -- the --, therefor.

In column 8, line 29, delete "signal" and insert -- single --, therefor.

In column 9, line 36, delete "exit" and insert -- exist --, therefor.

In column 10, line 5, in Claim 1, after "area" delete ",".

UNITED STATES PATENT AND TRADEMARK OFFICE
CERTIFICATE OF CORRECTION

PATENT NO.         : 7,380,723 B1
APPLICATION NO.  : 11/264200
DATED              : June 3, 2008
INVENTOR(S)      : Guillaume Oget It is certified that error appears in the above-identified patent and that said Letters Patent is hereby corrected as shown below:

In column 10, line 6, in Claim 1, delete "falling" and insert -- failing --, therefor.

In column 10, line 35, in Claim 1, delete "are" and insert -- area --, therefor.

In column 11, line 6, in Claim 7, after "time" delete "to" and insert -- in --, therefor.

In column 11, line 50, in Claim 12, delete "proceeded" and insert -- preceded --, therefor.

In column 12, line 21, in Claim 18, delete "in" and insert -- to --, therefor.

In column 12, line 24, in Claim 18, delete "area" and insert -- reader --, therefor.

In column 12, line 27, in Claim 18, delete "in" and insert -- to --, therefor.

Signed and Sealed this

Fourth Day of November, 2008

JON W. DUDAS
*Director of the United States Patent and Trademark Office*